March 13, 1962 R. J. BARLOW 3,024,810
TORQUE MOTOR ARMATURE DAMPING MECHANISM
Filed Oct. 5, 1959 2 Sheets-Sheet 2

INVENTOR.
ROLAND J. BARLOW
BY *James H Bower*
ATTORNEY

United States Patent Office 3,024,810
Patented Mar. 13, 1962

3,024,810
TORQUE MOTOR ARMATURE DAMPING MECHANISM
Roland J. Barlow, Madison Heights, Mich., assignor to Cadillac Gage Company, Roseville, Mich., a corporation of Michigan
Filed Oct. 5, 1959, Ser. No. 844,505
8 Claims. (Cl. 137—622)

This invention relates to a multi-stage hydraulic servo valve, and more specifically to the target armature of a torque motor which is used to control the valve of the hydraulic servo mechanism. The invention is an improvement in electro hydraulic servo valves of the type which is the subject matter of U.S. Patent No. 2,924,241 to Russell E. Bauer.

The invention improves the target armature as to reduce or eliminate the oscillation of the target, thus providing more accurate control of the system.

Oscillation has long been a problem in high first-stage gains of a multi-stage hydraulic servo valve. This oscillation and resulting instability of the valve occurs in sustained oscillation of the torque motor armature at a frequency dictated by the mass of the assembly and its net spring rate.

The oscillation problems prior to this invention were being counteracted in several ways. Some valves reduce the pressure to the ends of the spool, which reduces the pressure to the target. If the reduction is large enough the oscillation is eliminated, but this slows valve reaction time and reduces spool force which limits the application of the valve. Another method used to control vibration is by placing a pad of felt or other material at the butt end of the armature to act as a friction surface. This method has not proved successful. The characteristics of the material will not remain stable, thus constant results are not obtainable. Also, particles of the material become lost to the system causing undue wear in the valve and obstructions in the lines and nozzles. A further method is to shape the target armature such as using a flat target member. This seems to have little or no effect on damping the oscillation. Therefore, it is an important object of this invention to provide a reliable means of reducing the oscillation inherent within the valve.

Another object of the invention is to eliminate the noise which accompanies the high-frequency oscillation.

A further object of the present invention is to reduce fluttering of the valve spool.

It is a further object of this invention to reduce wear, thus increasing the life of the valve.

Additional objects, advantages and features of invention reside in the construction, arrangement and combination of parts involved in the embodiment of the invention, as will appear or be understood from the following description and accompanying drawings, wherein.

Figure 1:
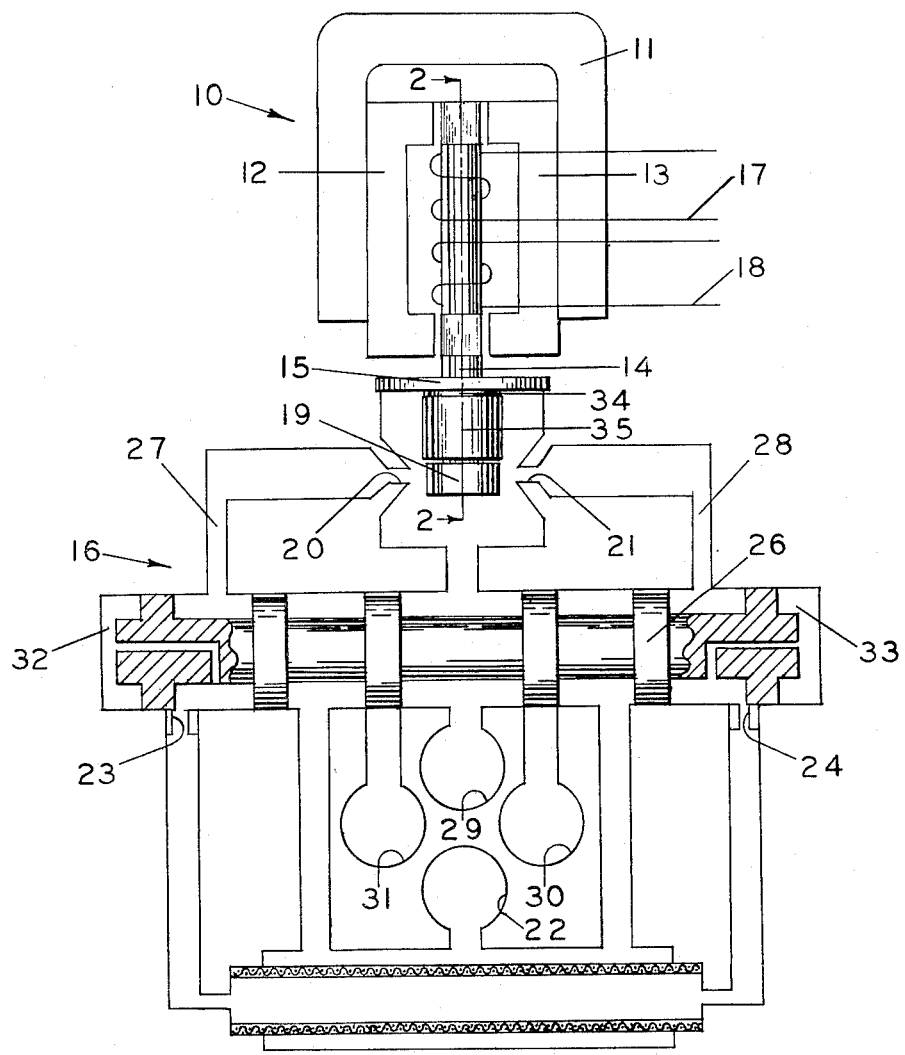
FIG. 1 is a schematic longitudinal sectional view of a multi-stage electro-hydraulic servo valve embodying the present invention.

Referring to the drawing in FIG. 1, there is illustrated a schematic view of a multi-stage electrohydraulic servo valve incorporating a torque motor 10, which is sometimes known as a stroke motor. This comprises the electromechanical circuit of the servo valve and includes a polarizing magnet 11, a pair of pole pieces 12 and 13, and an armature 14 pivotally mounted between the pole pieces. The structure for mounting the armature is by way of a flexible diaphragm 15, the peripheral portions of which are fixed with respect to the housing. The diaphragm 15 isolates the torque motor from the hydraulic system 16 and functions as a spring return on the armature, developing bending stresses as the armature is pivotally oscillated. It is readily seen, therefore, that this armature may develop rapid oscillations.

Encircling the above armature is a pair of coils 17 and 18 which receive electrical signals from a sensing device (not shown) and alter the magnetic flux in the gap between the pole faces to actuate the armature therebetween as a function of the polarity and amplitude of the input signals. For example, when the armature 14 is centered, the flux in the gap between it and the pole faces 12 and 13 is balanced, but when a direct current signal is passed through one of the coils 17 and 18, the flux in the gap between one pole face and the armature is increased, while the flux in the gap between the other pole face and the armature is decreased. This unbalanced flux creates a force which pivots the armature until such force is balanced by the bending strain on the diaphragm 15. When the control signal drops to zero, the strain on the diaphragm 15 returns the armature 14 to its central position. This movement of the armature 14 back and forth, together with its inherent weight, tends to permit oscillation of the armature 14.

Below the diaphragm 15 and securely attached to the lower end of armature 14 is a target 19. This target 19 acts as an obstruction to the flow of fluid through nozzles 20 and 21 positioned on opposite sides of the target 19. As the armature 14 and target 19, which is rigidly attached to the armature 14, move to the left or right, the flow from one nozzle is restricted, while the flow of fluid from the opposite nozzle increases due to the removal of the obstructing target. The flow of fluid through the above nozzles 20 and 21 originates from a central pressure source 22, passing first through a self-washing filter and then variable orifice 23 for nozzle 20 and variable orifice 24 for nozzle 21, and then around the main valve spool 26 into the nozzle conduits 27 and 28. As the hydraulic fluid passes through the nozzles 20 and 21 striking the target 19, it then passes to the hydraulic tank or reserve source 29 which is normally at zero hydraulic pressure.

The main valve spool 26 will move to the left or the right permitting pressure fluid to pass through conduits 30 or 31 respectively which are connected to a hydraulic actuator (not shown). The main spools will move to the left or right only when there is a differential pressure in chambers 32 and 33. The differential pressure in chambers 32 and 33 can only result from a movement of the target 19 restricting the flow of fluid from the nozzles. For example, when the target 19 moves to the left, nozzle 20 is restricted; therefore, pressure will build up in pressure chamber 32, thus forcing the main spool 26 to move from left to right. As the main spool 26 moves from left to right, variable orifice 23 is restricted while variable orifice 24 is opened. This will reduce the pressure in chamber 32 and increase the pressure in chamber 33. When the pressures in the two chambers are equal, the spool 26 will balance its movement at a new position at equilibrium. The above described hydraulic circuit constitutes a feedback loop and if sufficient power gain is handled, oscillations of the armature will result.

Also, due to the high nozzle pressures incorparted in such a system, and due to the mass of the armature 14 and target 19, together with the spring action developed in the diaphragm 15, the armature 14 will develop oscillations which are undesirable. The elimination of reduction of these oscillations of the armature 14 is one of the main objects of this invention.

Figure 2:
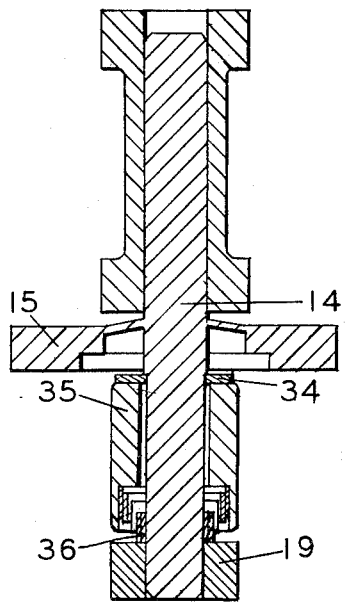
FIG. 2 is a longitudinal sectional view of the target armature mechanism of the valve illustrated in FIG. 1 taken substantially along line 2—2 of FIG. 1.

To obtain this object, I have invented a new and novel armature assembly which is shown in a detailed longitudinal sectional view in FIG. 2. It may be seen in FIG. 2 that a washer 34 is mounted directly below the diaphragm 15 and it is securely attached to the armature. Directly below the washer is a damping mass 35 which fits loosely around the armature 14 and is supported by a spring 36. The spring 36 contacts the armature 14 just above the target 19. The type of spring 36 that we have found to work most satisfactorily is a conical spiral spring which exerts a force on the damping mass 35 in an upward and outward direction.

Figure 3:
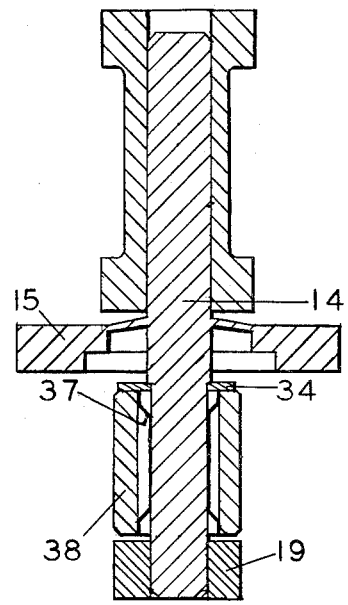
FIG. 3 is another longitudinal sectional view of the armature mechanism incorporating a modification of the damping means.

In FIG. 3 is shown a variation of the armature damping mass assembly. It may be seen that spring 37 supports the damping mass 38 away from armature 14 and that the damping mass 38 is free to oscillate out of phase with the armature oscillation. The spring 37, found most satisfactory, is a metal cylindrical spring having an hourglass shape.

Figure 4:
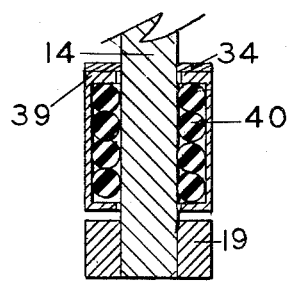
FIGS. 4 and 5 are sectional views illustrating further modification of the target armature mechanism.
Figure 5:
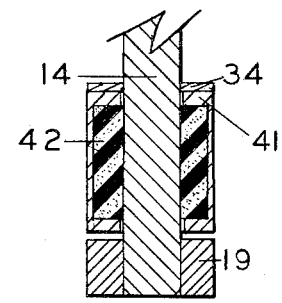

Further modifications of supporting a damping mass are illustrated in FIGS. 4 and 5. FIG. 4 illustrates supporting damping mass 39 by several resilient O-rings 40. FIG. 5 further illustrates supporting damping mass 41 by foam rubber 42. It is readily seen that the damping mass, when supported by the above resilient means, may oscillate independtly of the armature 14.

While I have shown and described my invention herein, numerous other changes and modifications may be made in the form, construction and arrangement of the elements without departing from the scope of this invention. In view thereof, it should be understood that the particular embodiments of the invention shown in the drawings and described above are intended to be illustrative only and not intended to limit the scope of the invention.

I claim:

1. In a flow control device, a variable outlet flow restriction, a pivotally oscillating member movable with respect to said restriction for varying the area thereof and the flow therethrough, and means to dampen the movement of said member, said means including a mass supported to allow its movement out of phase with the movement of said member.

2. In a flow control device, a variable outlet flow restriction, a pivotally oscillating member movable with respect to said restriction for varying the area thereof and the flow therethrough, and means to dampen the movement of said member, said means including a mass supported to allow its movement out of phase with the movement of said member, and resilient means to support said mass in a partially suspended position allowing for movement relative to said member.

3. The structure of claim 2, in which said resilient means is sponge rubber.

4. The structure of claim 2, in which said resilient means is resilient O-rings.

5. A damping mechanism of the type described comprising in combination, a cylindrical member encircling the object damped, a washer securely attached to said object and having frictional contact with said cylindrical member, a conical spiral spring supporting the cylindrical member and encircling the damped object and said spring urging the cylindrical member against said washer.

6. A torque motor armature comprising in combination, a pivotally oscillating central cylindrical shaft member having a target area at one extreme end for restriction of fluid flow, a cylindrical damping mass loosely surrounding said member permitting for its independent movement, a washer securely attached to said shaft member and having frictional contact with one end of the damping mass, and a metal cylindrical spring supporting said damping mass adapted to cause the mass to have a time lag approximately 180° behind any movement of the shaft member.

7. The structure of claim 2, in which said resilient means is a spring.

8. A damping mechanism of the type described comprising in combination, a pivotally oscillating cylindrical member encircling the object damped, a washer securely attached to said object and having frictional contact with the cylindrical member, a conical spiral spring encircling the damped object supporting the cylindrical member and urging the cylindrical member against said washer, and the conical spiral spring resisting radial movement of said cylindrical member with respect to the damped object.

References Cited in the file of this patent

UNITED STATES PATENTS

| 2,705,608 | Phillips | Apr. 5, 1955 |
| 2,835,265 | Brandstadter | May 20, 1958 |

OTHER REFERENCES

"Mechanical Vibrations" (Church), published by Wiley and Sons (London), 1957 (page 104 relied on).